United States Patent [19]

Bueler

[11] 3,955,371
[45] May 11, 1976

[54] ANTI-CUP CUTTING MASTER CYLINDER
[75] Inventor: Richard C. Bueler, Des Peres, Mo.
[73] Assignee: Wagner Electric Corporation, Parsippany, N.J.
[22] Filed: Nov. 18, 1974
[21] Appl. No.: 524,962

[52] U.S. Cl. .................................. 60/592; 92/51; 92/60
[51] Int. Cl.[2] .............................. F15B 7/00
[58] Field of Search ............ 60/592, 582, 588, 589; 138/31; 91/130 R, 173; 92/60, 51, 52

[56] References Cited
UNITED STATES PATENTS

| | | | |
|---|---|---|---|
| 3,149,468 | 9/1964 | Shutt | 60/582 X |
| 3,423,939 | 1/1969 | Lewis et al. | 60/592 X |
| 3,561,215 | 2/1971 | Krusemark | 60/582 X |
| 3,605,410 | 9/1971 | Herriott | 60/582 X |
| 3,698,190 | 10/1972 | Miyai | 60/582 X |
| 3,827,242 | 8/1974 | Belart | 60/582 X |
| 3,827,759 | 8/1974 | Belart | 60/582 X |

Primary Examiner—Martin P. Schwadron
Assistant Examiner—H. Burks, Sr.
Attorney, Agent, or Firm—James R. Bell

[57] ABSTRACT

A master cylinder having a secondary piston for absorbing rapid initial pressure increases in proportion to the stroke of the primary piston. The master cylinder includes a housing having a first cylinder formed therein. A first piston is movable within the first cylinder. A second cylinder is formed in the first piston. A second piston is movable within the second cylinder.

8 Claims, 2 Drawing Figures

ANTI-CUP CUTTING MASTER CYLINDER

BACKGROUND OF THE INVENTION

1. Field of the Invention

This invention relates generally to brakes and more specifically to fluid pressure operators for road vehicles.

2. Description of the Prior Art

Generally, hydraulic brake systems for road vehicles include a master cylinder connected in fluid communication with wheel cylinders located at the vehicle wheels. Fluid pressure is generated in the system at the master cylinder which pressure acts on the wheel cylinders to actuate the brakes. The pressure is generated at the master cylinder due to the application of an externally produced force, such as by force exerted on a brake pedal. The master cylinder generally comprises a reservoir and a main cylinder integratedly formed in a housing. Ports are provided to fluidly connect the reservoir and the main cylinder. Hydraulic fluid generally fills the brake system including the master cylinder reservoir, the main cylinder and the wheel cylinders. A piston is reciprocable in the main cylinder. When the brake pedal is depressed, the resulting force displaces the piston which creates pressure in the system acting through the fluid to actuate the brakes via the wheel cylinders. Pressure in the system is enhanced due to a resilient sealing cup adjacent one end of the piston.

One of the aforementioned ports which fluidly connects the reservoir and the main cylinder is generally referred to as a compensating or by-pass port which allows for relatively small increases and decreases in the volume of the fluid due to temperature changes by bleeding off excess fluid pressure from the main cylinder back into the reservoir. When the piston is displaced the annular periphery of the cup sealingly moves along the annular cylinder wall of the main cylinder. During this movement the cup passes over the compensating port. The system, being subjected to increasing pressure during piston displacement, and the cup being resilient, results in the increased pressure extruding a portion of the cup into the compensating port. Commonly, the edges of the port then cut off the extruded portion of the cup from the annular periphery. This is commonly known as cup cutting and causes leakage in the master cylinder which can cause eventual brake failure due to incapacity of the master cylinder to generate the required pressure in the brake system. The fluid used in such hydraulic systems is generally non-compressible and is consequently very responsive to the pressure applied.

In drum brake systems, the cup cutting problem is probably minimal. This is due to the fact that in such systems there is generally greater displacement of the piston since there is substantial clearance between the brake shoes and the brake drum and this clearance is directly proportional to the hydraulic displacement of the piston and fluid. The greatest portion of the piston displacement occurs at low pressure during the inintial pressure increase in the system so that the cup is usually past the port before the system is subjected to significant pressure.

In disc brake systems, however, the cup cutting problem is significantly increased since there is generally less clearance involved and thus less total displacement of the piston in the cylinder. In this case a significant pressure buildup occurs rapidly so that significant pressure exists when the cup moves through the cylinder across the port.

In the past, this problem has been reduced by incorporating a displacement cylinder in the system external to the master cylinder. The purpose of such a displacement cylinder is to absorb to take up the initial rapid increase in pressure during displacement of the piston to reduce initial pressure increase in the main cylinder until the piston and cup are displaced across the compensating port. Such displacement cylinders generally include a piston biased by a substantially low force spring so that upon initial application of the brakes, fluid from the master cylinder is absorbed by the displacement cylinder so that initial pressure increase is diverted from the main cylinder to the displacement cylinder while the piston experiences its normal displacement in the main cylinder. This in effect limits the pressure rise rate with respect to the stroke of the piston. Such external displacement cylinders cause valuable weight and space limitations in master cylinder construction and installation and can cause rather costly and complex innovations in master cylinder design and construction. In the interest of avoiding the above-mentioned limitations and complexities, it would be advantageous to provide means within the master cylinder, rather than external thereto, for the purpose of assuming rapid initial pressure increases associated with actuated master cylinder pistons.

SUMMARY OF THE INVENTION

Accordingly, this invention provides a novel displacement or secondary piston to the known master cylinder for absorbing rapid initial pressure increases in proportion to the stroke of the primary piston as associated with cup cutting. However, the secondary piston of this invention is included within the primary piston.

The foregoing is accomplished by providing a master cylinder including a housing having a first or primary cylinder formed therein. A first or primary piston is movable within the first cylinder. A second cylinder is formed in the first piston and a second piston is movable within the second cylinder. The first piston is biased to yield in response to an externally produced force such as a brake pedal application. The second piston may be biased to yield in response to an increase in pressure in the first cylinder caused by displacement of the first piston, or in the alternative, the second piston may be biased to yield in response to the external force directly applied to the second piston.

Other advantages and novel features of the invention will become apparent from the following detailed description of the invention when considered in conjunction with the accompanying drawings.

BRIEF DESCRIPTION OF THE DRAWINGS

In the drawings wherein like parts are marked alike.

DESCRIPTION OF THE PREFERRED EMBODIMENT

Figure 1:
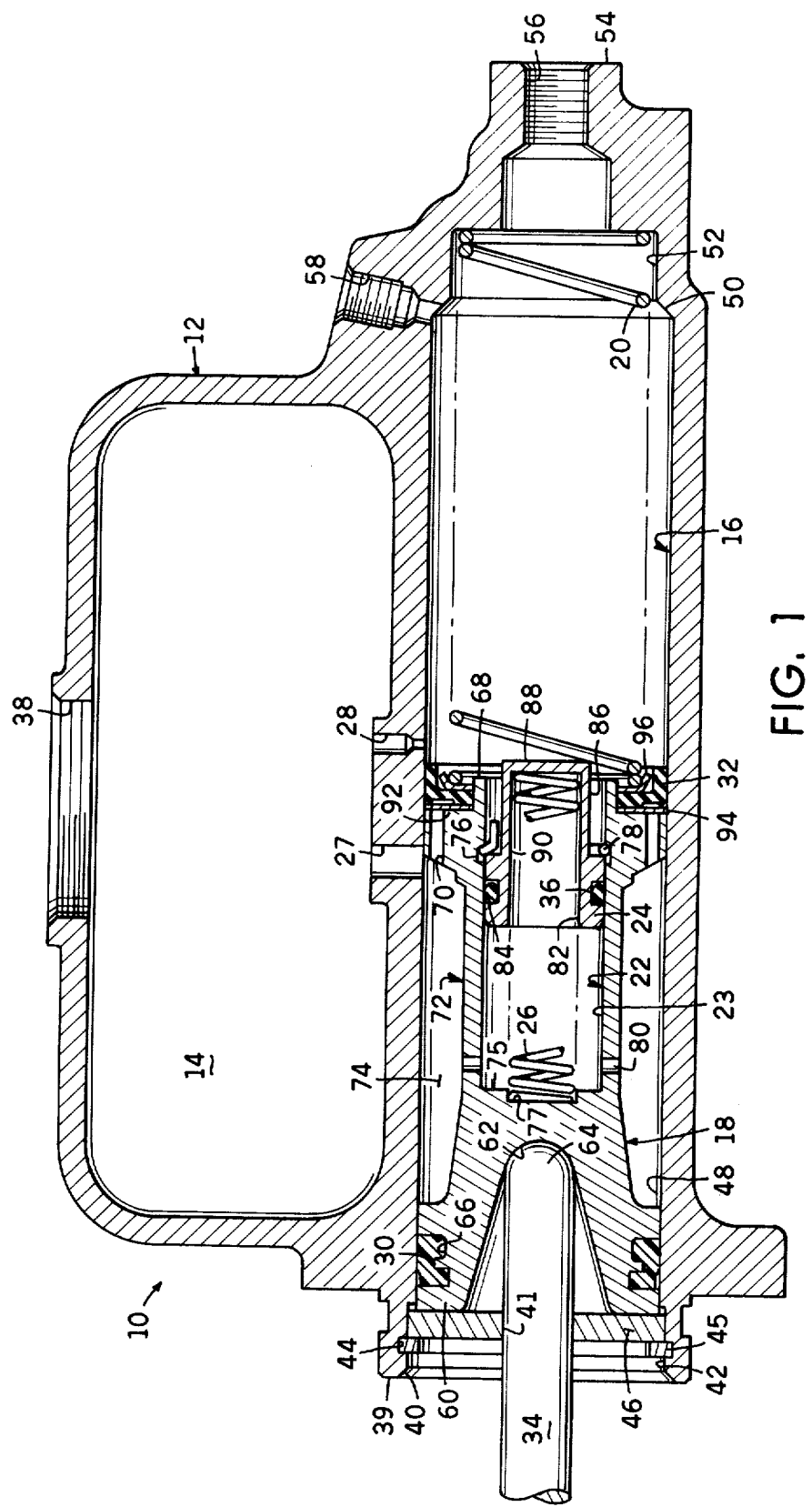
FIG. 1 is a cross-sectional side elevation illustrating prefered embodiment of the master cylinder of this invention.

In FIG. 1, the master cylinder of this invention is generally designated 10 and includes housing 12 having a reservoir 14 and a first or primary cylinder 16 therein.

First or primary piston 18 is reciprocably mounted in cylinder 16. Piston 18 is biased by primary or first spring 20. Within piston 18 a secondary cylinder 22 is formed. Secondary piston 24 is reciprocably mounted in cylinder 22 and is biased therein by secondary spring 26 which is a substantially relatively lighter load spring than spring 20.

Generally, brake fluid freely fills housing 12 including reservoir 14, and the primary and secondary cylinders 16, 22, respectively. The fluid has access between reservoir 14 and primary cylinder 16 via communicating port 27 and compensating port 28. Piston 18 is sealingly slidably engaged within cylinder 16 due to O-ring 30 and cup 32. Push rod 34 is actuated externally of the master cylinder by an externally produced force such as by pressure applied to a brake pedal by a vehicle operator. Second cylinder 22 and second piston 24 fluidly communicate with first cylinder 16 as is clearly shown in FIG. 1. Piston 24 is sealingly slidably engaged within cylinder 22 due to O-ring 36.

THE HOUSING

More specifically now, housing 12 is preferably of cast iron including reservoir portion 14 and first annular cylinder 16. Reservoir 14 is generally cylindrical and includes port 38 for filling the reservoir with fluid. Communicating port 27 is provided to permit fluid communication between reservoir 14 and first cylinder 16. Compensating port 28 is provided to fluidly communicate the reservoir and the first cylinder to allow for relatively small increases and decreases in the volume of the fluid due to temperature changes.

First cylinder 16 comprises a cylindrical void which is integratedly cast into housing 12 with reservoir 14. After casting, first cylinder 16 may be machined at first end 39 to include tapered end portion 40 and first bore 42 formed therein for accommodating stop plate 46. Annular groove 44 is provided in bore 42 for accommodating retainer ring 45. First cylinder 16 is stepped to include second bore 48 which accommodates piston 18. Tapered bore portion 50 interconnects second bore 48 with third bore portion 52 for accommodating spring 20. Cylinder 16 terminates at second end 54 including port 56 for fluidly communicating master cylinder 10 with the remaining portions of the brake system (not shown). Also, bleeding port 58 is generally formed in such master cylinders for bleeding unwanted air from the fluid system.

THE PRIMARY PISTON

First piston 18 is generally formed of machined or cast aluminum. The first piston generally includes first annular end 60 including notched portion 62 for receiving end 64 of rod 34 which slidably passes through opening 41 in stop plate 46. First end 60 is also provided with annular groove 66 for accommodating O-ring 30. Second annular end 68 of the first piston is provided to accommodate cup 32 and further includes bores 70. Between first end 60 and second end 68 is relatively smaller annular mid-portion 72 for providing a sub-cavity 74 within cylinder 16 between annular mid-portion 72 and second bore 48. Piston 18 also includes secondary annular cylinder 22 formed therein including annular groove 76 formed in inner annular periphery 23 for accommodating retainer ring 78. Ports 80 permit fluid communication between sub-cavity 74 and second cylinder 22. Cylinder 22 extends from its open end adjacent second end 68 of piston 18 into that piston to terminate at end wall 75. Recess 77 is provided in end wall 75 of cylinder 22 for accommodating one end of spring 26.

Radial land 92 of second end 68 is provided to accommodate cup 32 and cup protector 94 adjacent bores 70. Spring retainer 96 is provided to accommodate spring 20 whereby spring 20 urges retainer 96, cup 32 and protector 94 into position against annular land 92 of second end 68. In this manner, piston 18 is biased by spring 20 to yield in response to an externally produced force acting through rod 34.

SECONDARY PISTON

Second piston 24 is preferably of cast or machined aluminum and is generally cylindrical in shape including first flanged end 82 including annular groove 84 for accommodating O-ring 36 in reciprocating sealing engagement with annular inner periphery 23. Annular extended portion 86 is of a smaller diameter than flanged end 82 and terminates at second end 88. Second piston 24 further includes inner bore 90 for accommodating another end of spring 26 opposite the one end in recess 77. End 88 of second piston 24 is adjacent second end 68 of first piston 18 whereby the second piston is exposed to and is in fluid communication with first cylinder 16. Thus, piston 24 is biased by spring 26 to yield in response to increased pressure within first cylinder 16.

Figure 2:
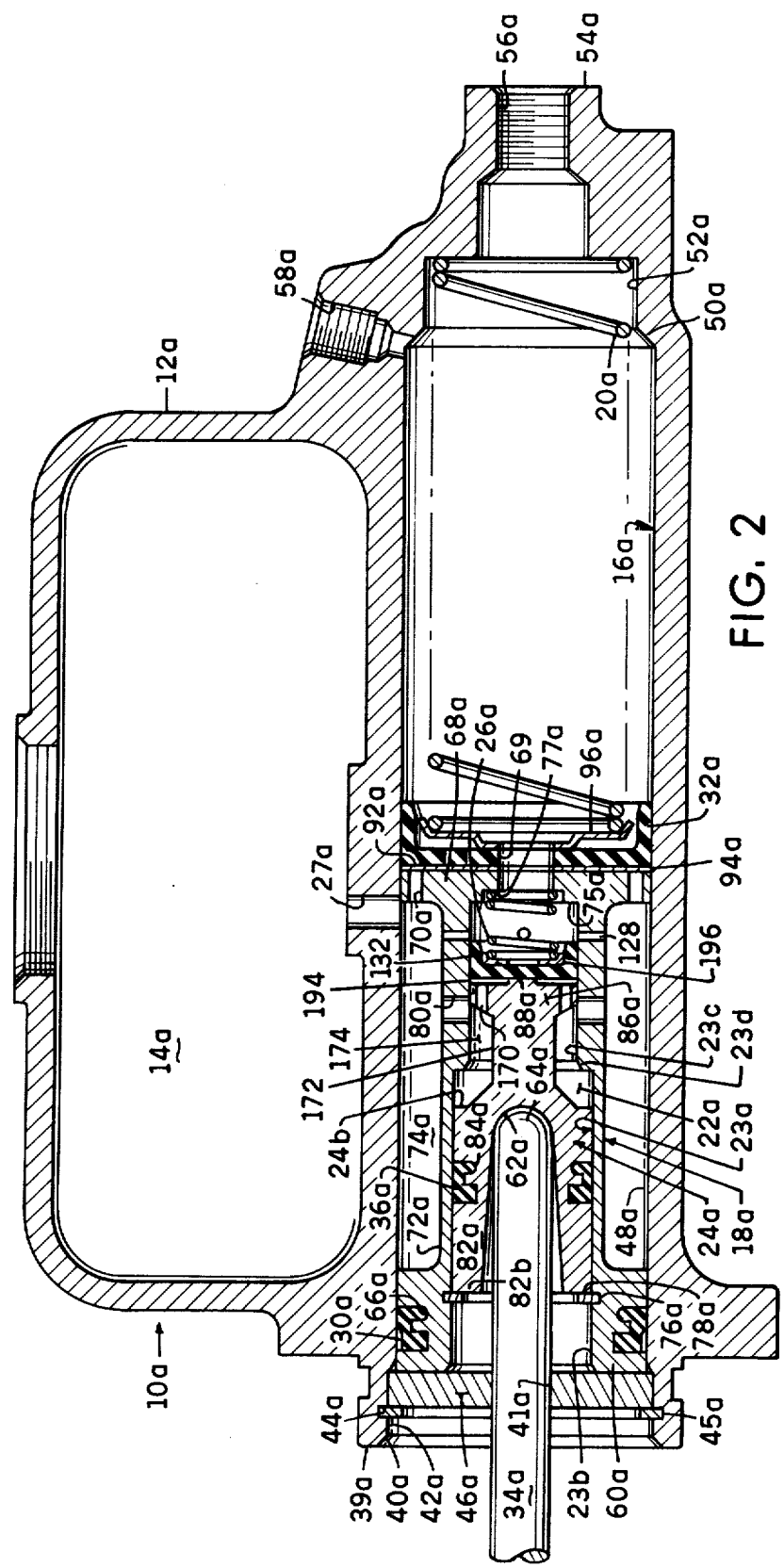
FIG. 2 is a cross-sectional side elevation illustrating an alternative embodiment of the master cylinder of this invention.

In the alternative embodiment, shown at FIG. 2, master cylinder 10a includes housing 12a which is preferably of cast iron further including reservoir portion 14a and first cylinder 16a. First or primary piston 18a is reciprocally mounted in cylinder 16a. Piston 18a is biased by primary or first spring 20a. Within piston 18a secondary cylinder 22a is formed. Secondary piston 24a is reciprocably mounted in cylinder 22a and is biased therein by secondary spring 26a which is a substantially relatively lighter load spring than spring 20a.

Generally, brake fluid freely fills housing 12a including reservoir 14a, and the primary and secondary cylinders 16a, 22a, respectively. The fluid has access between reservoir 14a and primary cylinder 16a via communicating port 27a. Piston 18a is sealingly slidably engaged within cylinder 16a due to O-ring 30a and cup 32a. Push rod 34a is actuated externally of the master cylinder by an externally produced force such as by pressure applied to a brake pedal by a vehicle operator. Second cylinder 22a and second piston 24a fluidly communicate with first cylinder 16a as is clearly shown in FIG. 2. Piston 24a is sealingly slidably engaged within cylinder 22a due to O-ring 36a and cup 132.

Housing 12a is similar to housing 12 as hereinabove described except that in housing 12a there is no compensating port such as that provided at 28 in housing 12. As stated above, port 28 is provided in housing 12 to fluidly communicate reservoir 14 and first cylinder 16 to allow for relatively small increases and decreases in the volume of the fluid due to temperature changes. Communicating port 27a is provided to permit fluid communication between reservoir 14a and first cylinder 16a.

First cylinder 16a comprises a cylindrical void which is integratedly cast into housing 12a with reservoir 14a. After casting, first cylinder 16a may be machined at first end 39a to include tapered end portion 40a and first bore 42a formed therein for accommodating stop plate 46a. Annular groove 44a is provided in bore 42a for accommodating retainer ring 45a. First cylinder 16a is stepped to include second bore 48a which accommodates piston 18a. Tapered bore portion 50a interconnects second bore 48a with third bore portion 52a for accommodating spring 20a. Cylinder 16a terminates at second end 54a including port 56a for fluidly communicating master cylinder 10a with the remaining portions of the brake system (not shown). Also, bleeding port 58a is generally formed in such master cylinders for bleeding unwanted air from the fluid system.

ALTERNATIVE PRIMARY PISTON

First piston 18a is generally formed of machined or cast aluminum. The first piston generally includes first annular end 60a provided with annular groove 66a for accommodating O-ring 30a. Second annular end 68a of the first piston is provided to accommodate cup 32a and further includes bores 70a. Between first end 60a and second end 68a is relatively smaller annular mid-portion 72a for providing a first sub-cavity 74a within cylinder 16a between annular mid-portion 72a and second bore 48a. Piston 18a also includes secondary annular cylinder 22a formed therein including annular groove 76a formed in inner annular periphery 23a for accommodating retainer ring 78a. Cylinder 22a extends from its open end adjacent first end 60a of piston 18a into that piston to terminate at end wall 75a adjacent second end 68a. Inner annular periphery 23a includes portion 23b opening into first end 60a and portion 23c opening into second end 68a via annular bore 69. Tapered intermediate portion 23d interconnects relatively larger portion 23b with relatively smaller portion 23c. Bore 69 extends from portion 23c through second end 68a to fluidly connect second cylinder 22a with first cylinder 16a. Ports 80a permit fluid community between sub-cavity 74a and second cylinder 22a. Annular recess 77a is formed in end wall 75a in cylinder 22a intermediate of portion 23c and bore 69 for accommodating one end of spring 26a.

Radial face 92a of second end 68a of first piston 18a is provided to accommodate cup 32a and cup protector 94a adjacent bores 70a. Spring retainer 96a is provided to accommodate spring 20a whereby spring 20a urges retainer 96a, cup 32a and protector 94a into position with second end 68a. In this manner, piston 18a is biased by spring 20a to yield in response to an externally produced force acting through rod 34a.

ALTERNATIVE SECONDARY PISTON

Second piston 24a is preferably of cast or machined aluminum and is generally cylindrical in shape including first flanged end 82a including annular shoulder 82b and further including annular groove 84a for accommodating O-ring 36a in reciprocating sealing engagement with portion 23b of annular inner periphery 23a. Annular extended second flanged end portion 86a is of a smaller diameter than flanged end 82a and terminates at radial face 88a. Second piston 24a further includes notched portion 62a adjacent first end 82a for receiving end 64a of rod 34a which slidably passes through opening 41a in stop plate 46a. Second end 86a is provided to accommodate second cup 132 and further includes bores 170. Between first end 82a and second end 86a is relatively smaller annular mid-portion 172 for providing second sub-cavity 174 within second cylinder 22a between annular mid-portion 172 and annular inner periphery 23a.

Annular radial face 88a is provided to accommodate cup 132 and cup protector 194 adjacent bores 170. Spring retainer 196 is provided to accommodate the other end of spring 26a opposite the end seated in recess 77a whereby spring 26a urges retainer 196, cup 132 and protector 194 into position abutting radial face 88a. Cup 132 of second piston 24a is adjacent second end 68a of first piston 18a whereby the second piston is exposed to an is in fluid communication with first cylinder 16a via port 69. Thus, piston 24a is biased by spring 26a to yield in response to an externally produced force directly applied thereto via rod 34a.

Compensating port 128 is provided to fluidly communicate first sub-cavity 74a with second cylinder 22a and first cylinder 16a to allow for relatively small increases and decreases in the volume of the fluid due to temperature changes.

OPERATION

In FIG. 1, it can be seen from the foregoing that as push rod 34 directly urges primary piston 18 to the right (as shown in the drawing) against the opposing force of spring 20, pressure will build in cylinder 16 to the right of cup 32. Inasmuch as secondary cylinder 22 and secondary piston 24 are in fluid communication with first cylinder 16, the increasing pressure acts on secondary piston 24. As the pressure continues to build, and as cup 32 passes over port 28, secondary low force spring 26 is compressed by the leftward movement (as shown in the drawing) of secondary piston 24 caused by the increasing pressure so that the initial increase in pressure which would otherwise occur in first cylinder 16 is diverted to second cylinder 22 wherein it is absorbed. Leftward movement of piston 24 results in initially increasing the volume made available to the fluid being compressed due to the rightward movement of piston 18. This increase in volume limits the rapid initial pressure buildup in first cylinder 16 until cup 32 has moved from left to right across port 28. By the time the pressure increase in cylinder 16 is increased sufficiently to extrude cup 32 into port 28 the cup has moved to the right of the port. Thus, the delay in initial pressure buildup is provided in proportion to the stroke of the primary piston. Primary return spring 20 is preloaded to insure that piston 18 will return to seat against end cap 46 when external pressure is no longer applied through rod 34 and secondary return spring 26 is preloaded to insure that piston 24 will return to seat against retainer ring 78. Ports 80 relieve fluid pressure from secondary cylinder 22 as secondary piston 24 moves leftwardly within cylinder 22. Such fluid pressure is relieved due to fluid communication between cylinder 22 and sub-chamber 74 via port 80 and between sub-chamber 74 and reservoir 14 via port 27. Fluid in sub-chamber 74 is permitted to communicate with the main portion of primary cylinder 16 via ports 70 as piston 18 returns leftwardly to seat against end cap 46. Plate 94 protects cup 32 from the force of fluid passing through port 70 in such a manner.

In FIG. 2, it can be seen alternatively that as push rod 34a indirectly urges primary piston 18a to the right (as shown in the drawing) against the opposing force of primary spring 20a, it does so only through direct action in urging secondary piston 24a to the right against the opposing force of secondary spring 26a. Due to the direct action of rod 34a on secondary piston 24a and further due to the biasing of piston 24a against such direct action by relatively low force spring 26a, the initial portion of the stroke of rod 34a is absorbed by the permitted travel of secondary piston 24a within secondary cylinder 22a of primary piston 18a. In this manner, secondary cup 132 moves to the right past compensating port 128 prior to the buildup of significant pressure within the system capable of extruding cup 132 into port 128. When annular shoulder 24b of second piston 24a seats against annular land 23e of second cylinder 22a, the force acting through rod 34a is indirectly exerted on primary piston 18a to move that piston rightwardly against the opposing force of primary spring 20a. As the pressure continues to build, cup 32a is urged rightwardly by piston 18a to compress the fluid in main cylinder 16a. Thus, initial displacement of second piston 24a moves cup 132 across compensating port 128 during initial relatively low pressure buildup in the system thus avoiding the extrusion of cup 132 into port 128. Primary return spring 20a is preloaded to insure that piston 18a will return to seat against end cap 46a when external pressure is no longer applied through rod 34a and secondary return spring 26a is preloaded to insure that piston 24a will return to seat against retainer ring 78a. Ports 80a relieve fluid pressure from secondary cylinder 22a as secondary piston 24a moves leftwardly within cylinder 22a as shown in FIG. 2. Such fluid pressure is relieved due to fluid communication between cylinder 22a and sub-chamber 74a via port 880a and between sub-chamber 74a and reservoir 14a via port 27a. Fluid in primary sub-chamber 74a is permitted to communicate with the main portion of primary cylinder 16a via ports 70a as piston 18a returns leftwardly to seat against end cap 46a. Plate 94a protects cup 32a from the force of fluid passing through port 70a in such a manner. Similarly, fluid in secondary sub-chamber 174 is permitted to communicate with the main portion of primary cylinder 16a via ports 170, and port 69 as piston 24a returns leftwardly to seat against retainer ring 78a. Secondary plate 194 protects secondary cup 132 from the force of fluid passing through port 170 in such a manner.

The foregoing describes a novel displacement or secondary piston provided within a primary piston to the known master cylinder for absorbing rapid initial pressure increases in proportion to the stroke of the primary piston as associated with cup cutting.

Having thus described the invention in its best embodiment and mode of operation, that which is desired to be claimed by letters patent is:

1. A master cylinder comprising:
   a housing having a first cavity formed therein;
   reservoir means in the housing for containing fluid therein:
   a first piston movable within the first cavity, the first piston having a second cavity formed therein in open fluid communication with the first cavity, and an annular groove formed in the outer periphery thereof between first and second ends of the piston;
   seal means mounted on the first piston in the outer periphery thereof adjacent the first and second ends for sealingly separating the annular groove and the first cavity;
   a second piston sealingly and slidably mounted within the second cavity;
   a plurality of port means cooperatingly formed in the housing and the first piston for permitting fluid communication between the reservoir and the first cavity, between the reservoir and the annular groove and between the groove and the second cavity; and
   means connected for responding to an externally produced force for moving one of the pistons, with respect to the other of the pistons for sealingly interrupting fluid communication between the reservoir and the first cavity and for permitting fluid communication between the reservoir and the annular groove and between the annular groove and the second cavity.

2. A master cylinder comprising:
   a housing having a first cavity formed therein;
   reservoir means in the housing for containing fluid therein:
   a first piston sealingly and slidably mounted in the first cavity, the first piston having a second cavity formed therein and an annular groove formed in the outer periphery thereof between first and second ends of the piston;
   a second piston sealingly and slidably mounted in the second cavity;
   a plurality of port means cooperatingly formed in the housing and the first piston for permitting fluid communication between the reservoir and the first cavity, between the reservoir and the annular groove and between the groove and the second cavity; and
   means connected for responding to an externally produced force for moving one of the pistons, with respect to the other of the pistons, for sealingly interrupting fluid communication between the reservoir and the first cavity and for permitting fluid communication between the reservoir and the annular groove and between the annular groove and the second cavity.

3. The master cylinder of claim 1, wherein:
   the first piston is biased for movement in the first cavity by a first resilient means;
   the second piston is biased for movement relative to the first piston by a second resilient means mounted therebetween;
   one of the part means is formed in the housing to interconnect the reservoir and the first cavity;
   another of the port means is formed in the housing to interconnect the reservoir and the annular groove; and
   still another of the port means is formed in the first piston to interconnect the annular groove and the second cavity.

4. The master cylinder of claim 1, wherein:
   the first piston is biased for movement in the first cavity by a first resilient means;
   the second piston is biased for movement relative to the first piston by a second resilient means mounted therebetween;
   one of the port means is formed in the housing to interconnect the reservoir and the annular groove;
   another of the port means is formed in the first piston to interconnect the annular groove and the first cavity; and
   still another of the port means is formed in the first piston to interconnect the annular groove and the second cavity.

5. In a vehicle brake system of the type including a master cylinder connected for fluid communication with brake cylinders in the vehicle wheels, the improvement comprising:

a master cylinder housing having a first cavity formed therein;

reservoir means in the housing for containing fluid therein;

a first piston sealingly and slidably mounted in the first cavity and an annular groove formed in the outer periphery thereof between first and second ends of the piston;

a second piston sealingly and slidably mounted in the second cavity;

a plurality of port means cooperatingly formed in the housing and the first piston for permitting fluid communication between the reservoir and the first cavity, between the reservoir and the annular groove and between the groove and the second cavity; and means connected for responding to an externally produced force for moving one of the pistons, with respect to the other of the pistons, for sealingly interrupting fluid communication between the reservoir and the first cavity and for permitting fluid communication between the reservoir and the annular groove and between the annular groove and the second cavity.

6. The system of claim 5, wherein:

the first piston is biased for movement in the first cavity by a first resilient means;

the second piston is biased for movement relative to the first piston by a second resilient means mounted therebetween;

one of the port means is formed in the housing to interconnect the reservoir and the first cavity;

another of the port means is formed in the housing to interconnect the reservoir and the annular groove; and still another of the port means is formed in the first piston to interconnect the annular groove and the second cavity.

7. The system of claim 5, wherein:

the first piston is biased for movement in the first cavity by a first resilient means;

the second piston is biased for movement relative to the first piston by a second resilient means mounted therebetween;

one of the port means is formed in the housing to interconnect the reservoir and the annular groove;

another of the port means is formed in the first piston to interconnect the annular groove and the first cavity; and still another of the port means is formed in the first piston to interconnect the annular groove and the second cavity.

8. In a vehicle brake system of the type including a master cylinder connected for fluid communication with brake cylinders in the vehicle wheels, the improvement comprising:

a master cylinder housing having a first cavity formed therein;

reservoir means in the housing for containing fluid therein;

a first piston movable within the first cavity, the first piston having a second cavity formed therein in open fluid communication with the first cavity, and an annular groove formed in the outer periphery thereof between first and second ends of the piston;

seal means mounted on the first piston in the outer periphery thereof adjacent the first and second ends for sealingly separating the annular groove and the first cavity;

a plurality of port means cooperatingly formed in the housing and the first piston for permitting fluid communication between the reservoir and the first cavity, between the reservoir and the annular groove and between the groove and the second cavity; and means connected for responding to an externally produced force for moving one of the pistons, with respect to the other of the pistons, for sealingly interrupting fluid communication between the reservoir and the first cavity and for permitting fluid communication between the reservoir and the annular groove and between the annular groove and the second cavity.

* * * * *